(12) United States Patent
Hartlieb et al.

(10) Patent No.: US 12,515,488 B2
(45) Date of Patent: Jan. 6, 2026

(54) MOTOR VEHICLE HAVING AN ACTIVE DAMPING CONTROL

(71) Applicant: Dr. Ing. h.c. F. Porsche Aktiengesellschaft, Stuttgart (DE)

(72) Inventors: Stefan Hartlieb, Filderstadt-Plattenhardt (DE); Swen Zschocke, Wiernsheim-Serres (DE); Josef Paleczek, Tiefenbronn (DE)

(73) Assignee: Dr. Ing. h.c. F. Porsche Aktiengesellschaft (DE)

(*) Notice: Subject to any disclaimer, the term of this patent is extended or adjusted under 35 U.S.C. 154(b) by 9 days.

(21) Appl. No.: 18/648,533

(22) Filed: Apr. 29, 2024

(65) Prior Publication Data

US 2025/0018758 A1 Jan. 16, 2025

(30) Foreign Application Priority Data

Jul. 13, 2023 (DE) ...................... 10 2023 118 620.5

(51) Int. Cl.
*B60G 17/08* (2006.01)
*B60G 15/12* (2006.01)
*F16F 9/18* (2006.01)

(52) U.S. Cl.
CPC ............ *B60G 15/12* (2013.01); *B60G 17/08* (2013.01); *F16F 9/185* (2013.01);
(Continued)

(58) Field of Classification Search
CPC ... F16F 9/185; F16F 9/43; F16F 9/062; B60G 15/14; B60G 2500/10; B60G 2500/11; B60G 2206/41; B60G 2202/152; B60G 2202/24; B60G 2202/314; B60G 17/08; B60G 15/12
See application file for complete search history.

(56) References Cited

U.S. PATENT DOCUMENTS 7,543,824 B2 6/2009 Chapman
2014/0231200 A1* 8/2014 Katayama ............. F16F 9/3257
188/314
(Continued)

FOREIGN PATENT DOCUMENTS

DE 102015200450 A1 * 7/2016 ............... F16F 9/49
DE 102016213957 A1 2/2018
(Continued)

OTHER PUBLICATIONS

Andreas Forster, Vibration dampers and motor vehicles, Jul. 14, 2016, EPO, DE 10 2015 200 450 A1, Machine Translation of Description (Year: 2016).*

*Primary Examiner* — James A English
(74) *Attorney, Agent, or Firm* — Buchanan Ingersoll & Rooney PC (57) ABSTRACT

A motor vehicle having an active damping control, which includes at least one vibration damper having a damper piston, which can be moved back and forth in a main pipe with hydraulic medium in an axial direction relative to the main pipe. The main pipe is arranged in a container pipe. An intermediate pipe is arranged between the main pipe and the container pipe. The main pipe, the intermediate pipe and the container pipe are arranged coaxially in a three-pipe damper. The damper piston is attached to an end of a piston rod.

8 Claims, 5 Drawing Sheets

(52) U.S. Cl.
CPC .... *B60G 2202/152* (2013.01); *B60G 2202/24* (2013.01); *B60G 2202/314* (2013.01); *B60G 2206/41* (2013.01); *B60G 2500/10* (2013.01)

(56) References Cited

U.S. PATENT DOCUMENTS

| | | | | |
|---|---|---|---|---|
| 2019/0100068 A1* | 4/2019 | Tong | ........................ | F16F 9/19 |
| 2020/0040960 A1* | 2/2020 | Woenarta | .................. | F16K 1/04 |
| 2024/0418234 A1* | 12/2024 | Beilner | ..................... | F16F 9/43 |

FOREIGN PATENT DOCUMENTS

| | | | | |
|---|---|---|---|---|
| DE | 102017220081 A1 | | 5/2019 | |
| DE | 102021202237 A1 | | 9/2022 | |
| DE | 102021212966 A1 | * | 5/2023 | ............... F16F 9/50 |
| EP | 1634733 B1 | | 6/2009 | |

* cited by examiner

MOTOR VEHICLE HAVING AN ACTIVE DAMPING CONTROL

CROSS-REFERENCE TO RELATED APPLICATION

This application claims priority to German Patent Application No. 10 2023 118 620.5, filed Jul. 13, 2023, the content of such application being incorporated by reference herein in its entirety.

FIELD OF THE INVENTION

The invention relates to a motor vehicle having an active damping control, which comprises at least one vibration damper having a damper piston, which can be moved back and forth in a main pipe with hydraulic medium in an axial direction relative to the main pipe, wherein the main pipe is arranged in a container pipe, wherein an intermediate pipe is arranged between the main pipe and the container pipe, wherein the main pipe, the intermediate pipe and the container pipe are arranged coaxially in a three-pipe damper, wherein the damper piston is attached to an end of a piston rod.

BACKGROUND OF THE INVENTION

The German publication DE 10 2021 202 237 A1, which is incorporated by reference herein, discloses a motor vehicle shock absorber with a separate hydraulic connection fixed to a valve block by means of fasteners and comprising internal shut-off valves. The German publication DE 10 2017 220 081 A1, which is incorporated by reference herein, discloses a motor vehicle shock absorber with a separate, annular connection block. The German publication DE 10 2016 213 957 A1, which is incorporated by reference herein, discloses a hydropneumatic actuator with two separate fluid fill ports, each comprising a shut-off valve. The European specification EP 1 634 733 B1, which is incorporated by reference herein, discloses a hydraulic suspension for the front axle of an agricultural tractor, in which connections for feed lines are configured on a valve block.

SUMMARY OF THE INVENTION

Described herein is a motor vehicle having an active damping control, which comprises at least one vibration damper having a damper piston, which can be moved back and forth in a main pipe with hydraulic medium in an axial direction relative to the main pipe, wherein the main pipe is arranged in a container pipe, wherein an intermediate pipe is arranged between the main pipe and the container pipe, wherein the main pipe, the intermediate pipe and the container pipe are arranged coaxially in a three-pipe damper, wherein the damper piston is attached to an end of a piston rod, in that the three-pipe damper is equipped with a hydraulic end position damper and, at its end facing away from the piston rod, has a central valve block with two damper valve devices and with a connection valve block, which is configured as a separate component and comprises at least two hydraulic connections, wherein the connection valve block with the hydraulic connectors is arranged and aligned independently of two damper valve blocks on a base block in a package-dependent manner, such that both a connection of the hydraulic lines, and a proper function of the vibration damper are ensured when the vibration damper is mounted with further components on the motor vehicle, wherein the three-pipe damper has a gas balance volume at its piston rod end, which is arranged in an annular space between the intermediate pipe and the container pipe. The vibration damper comprises an air spring in addition to the three-pipe damper with the hydraulic end position damping, which is particularly advantageous. On the one hand, this provides a vibration damper or shock absorber that enables very comfortable operation of a motor vehicle equipped with the vibration damper or shock absorber both at high frequencies and low frequencies. This provides an elegant solution to the installation space conflict resulting from the combination of the gas balance volume and the air spring on the three-pipe damper. At the piston end of the three-pipe damper, the annular space between the intermediate pipe and the container pipe is effectively used to accommodate the gas balance volume. The gas balance volume is advantageously illustrated with a gas bag containing a gas, such as air. The gas bag is formed from a gas-tight flexible material. The gas bag is located between the intermediate pipe and the container pipe and is connected with a bayonet valve. During operation of the vibration damper, the gas bag provides separation between oil and gas. Moreover, the gas bag prevents the oil from foaming. At the end of the three-pipe damper facing away from the piston rod, a sufficiently large air volume may be provided particularly advantageously for the air spring by partially surrounding the central valve block with the air spring. The resulting disadvantage with regard to the connection of hydraulic lines to the central valve block is deliberately accepted. The two damper valve devices advantageously each include a check valve. One of the damper valve devices also comprises a rebound valve. The other damper valve device advantageously comprises a pressure stage valve in addition to the check valve.

A preferred example embodiment of the motor vehicle is characterized in that shut-off screws of shut-off valves for the hydraulic connections are integrated into the connection valve block. This provides the advantage, among other things, that the vibration damper, which is designed as a three-pipe damper, can be manufactured, filled and tested in its entirety. Furthermore, replacement of vibration damper components, for example for repair purposes, is simplified. The three-pipe damper is advantageously pre-filled with low-air hydraulic medium.

A further preferred example embodiment of the motor vehicle is characterized in that the shut-off screws are aligned parallel to each other. This further simplifies the assembly of the vibration damper.

A further preferred example embodiment of the motor vehicle is characterized in that the hydraulic connections are aligned parallel to each other. This simplifies the design of the motor vehicle with the active damping control.

A further preferred example embodiment of the motor vehicle is characterized in that the damper valve blocks and the connection valve block are provided on the base block extending in extension of the container pipe and from which the two damper valve blocks extend coaxially to each other in opposite directions radially outwards. Thus, an existing installation space in the motor vehicle can be easily exploited with the active damping control without affecting the function of the vibration damper.

A further preferred example embodiment of the motor vehicle is characterized in that the connection valve block is screwed onto the base block. This provides the advantage, among other things, that different connection valve blocks can be designed independently of each other for vehicle variants or vehicle derivatives. The different connection valve blocks may then be combined with a base block that is configured the same for all motor vehicle variants or motor vehicle derivatives.

A further preferred example embodiment of the motor vehicle is characterized in that the base block is surrounded by an air spring housing. As a result, the air spring, which is advantageously combined with the vibration damper, may advantageously be equipped with a larger air spring volume.

A further preferred example embodiment of the motor vehicle is characterized in that the air spring housing extends up to the connection valve block. The air spring housing is advantageously configured and arranged relative to the connection valve block, such that the desired accessibility of the hydraulic connections and, if necessary, also the shut-off screws is ensured.

A further preferred example embodiment of the motor vehicle is characterized in that the air spring housing extends up to the damper valve blocks. Thus, the existing installation space for the air spring housing can be utilized without affecting the connection of the hydraulic line or the operation of the vibration damper in the installed state.

The invention further relates to a central valve block, in particular a connection valve block, a base block, and/or a damper valve block, and/or an air spring housing for a previously described motor vehicle. The aforementioned parts can be purchased separately.

BRIEF DESCRIPTION OF THE DRAWINGS

Further advantages, features, and details of the invention arise from the following description, in which various example embodiments of the invention are described in detail with reference to the drawings. The figures show.

DETAILED DESCRIPTION OF THE INVENTION

Figure 1:
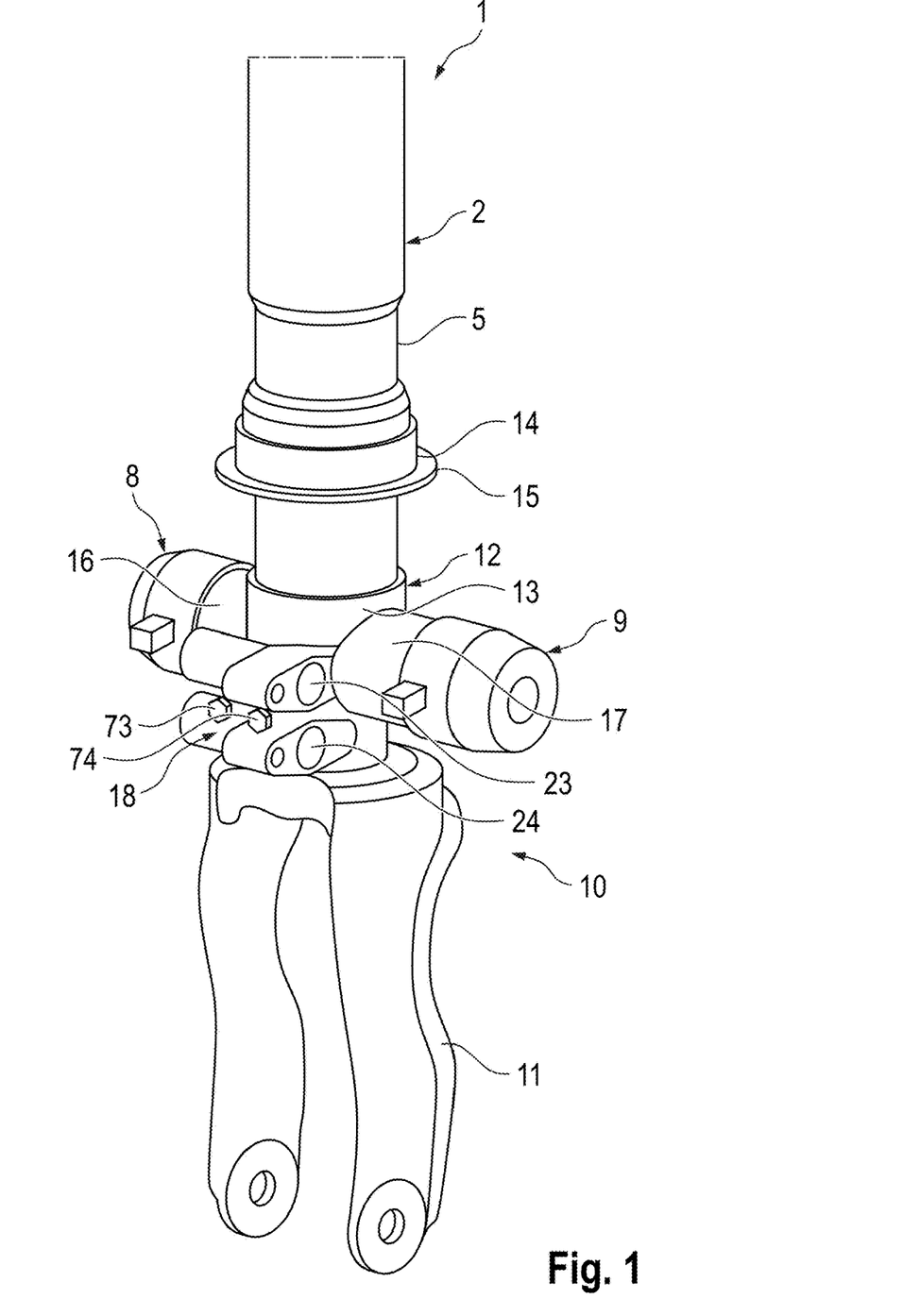
FIG. 1 shows a perspective view of a suspension strut with a three-pipe damper.
Figure 2:
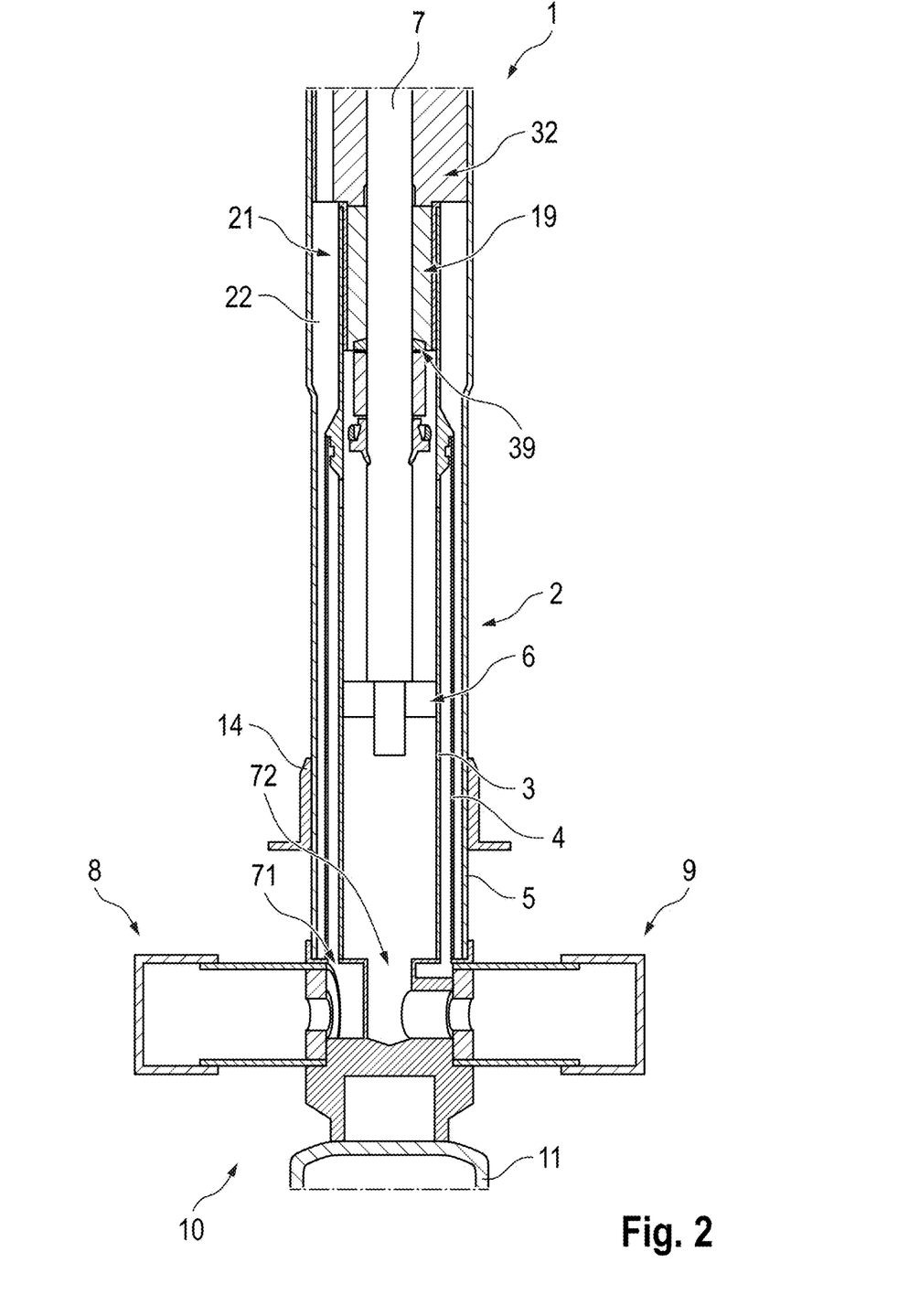
FIG. 2 shows the three-pipe damper of FIG. 1 in a schematic cross-section.
Figure 3:
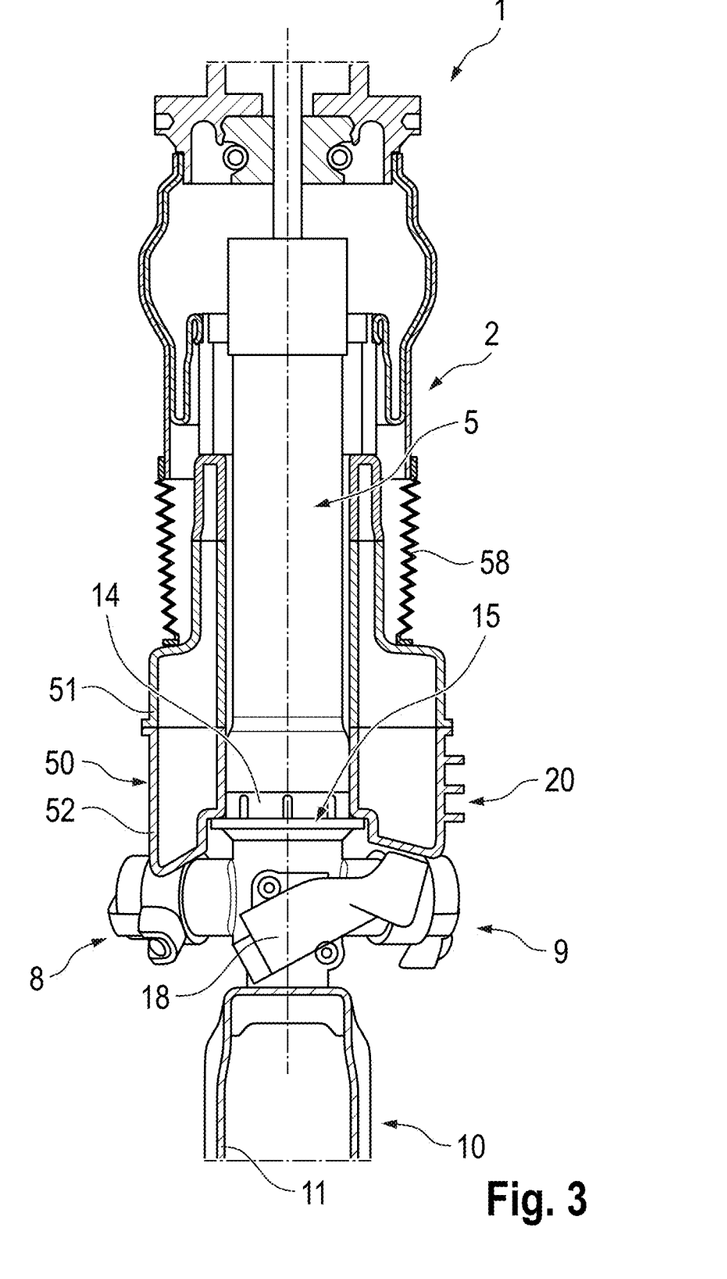
FIG. 3 shows the three-pipe damper in FIG. 1 in a longitudinal sectional view, wherein a container pipe of the three-pipe damper is not shown in section.

FIGS. 1 to 3 shows a suspension strut 10 with a spring fork 11 in various views. The suspension strut 10 comprises a vibration damper 1, also referred to as a shock absorber. The vibration damper 1 is configured as a three-pipe damper 2 having a main pipe 3, an intermediate pipe 4 and a container pipe 5.

The suspension strut 10 with the vibration damper 1, which is designed as a three-pipe damper 2, is part of a hydraulic system that serves in a motor vehicle to represent an active damping control during operation of the motor vehicle. The motor vehicle preferably comprises four wheels, each of which is associated with a vibration damper 1 configured as a three-pipe damper 2. The three-pipe damper or vibration damper is also referred to as a damper for short. The hydraulic damper represents a shock absorber in an active chassis of a motor vehicle.

The three-pipe damper 2 is operated with a hydraulic medium. The hydraulic medium is preferably a hydraulic fluid, which will also be referred to as a hydraulic oil or abbreviated as "oil". In addition to a hydraulic damper volume, the hydraulic damper comprises a gas balance volume 21.

The active damping control comprises a hydraulic actuator apparatus, which is hydraulically connected to the dampers via the hydraulic lines. The hydraulic actuator apparatus in the active chassis of the motor vehicle is used to stimulate or drive the hydraulic dampers in a targeted manner. To this end, the hydraulic actuator apparatus advantageously comprises a separate hydraulic pump for each damper. Two hydraulic pumps can be combined together in each axle of the motor vehicle into one motor-pump unit. The hydraulic pumps associated with the respective axle are advantageously controllable separately via a common control unit.

In the main pipe 3 of the three-pipe damper 2, a damper piston 6 in FIG. 2 can be moved back and forth downwards and upwards. A piston rod 7 extends from the damper piston 6, which in FIG. 2 extends upwards out of the three-pipe damper 2 through a seal guide unit 32. An upper end of the piston rod 7 (not shown in FIG. 2) is connected to a support structure of the motor vehicle.

The main pipe 3, the intermediate pipe 4 and the container pipe 5 are arranged coaxially and provided with interstices in the radial direction. An annular space between the main pipe 3 and the intermediate pipe 4 allows the hydraulic medium to pass through, in particular a return line of the hydraulic medium downwards, without extra hydraulic lines. An annular space between the intermediate pipe 4 and the container pipe 5 advantageously serves to receive the gas balance volume 21.

The gas balance volume 21 is illustrated with a gas bag 22, which is received at a piston rod end of the three-pipe damper 2, i.e. in FIG. 2 above, between the intermediate pipe 4 and the container pipe 5. Radially within the gas balance volume 21, the piston rod 7 in the main pipe 3 is surrounded by a hydraulic end position damper 19 with a hydraulic pull stop 39.

At its lower end, in FIG. 2, the three-pipe damper 2 is equipped with a central valve block 12. Two damper valve devices 8 and 9 are integrated into the central valve block 12. The damper valve devices 8 and 9 each include a check valve.

Furthermore, the damper valve device 8 comprises a rebound valve that is hydraulically connected via an annular gap 71 to the annular space between the main pipe 3 and the intermediate pipe 4. In FIG. 2, the main pipe 3 is connected to a pressure stage valve in the damper valve device 9 at the bottom via a relatively large central through-hole 72.

The central valve block 12 comprises a base block 13, which is configured as a full pipe body, for example. The outside of the base block 13 has the shape of a straight circular cylindrical shell, for example. For example, the base block 13 is configured as a milling part and attached to the lower end of the three-pipe damper 2.

The center valve block 12 further comprises two damper valve blocks 16, 17 that are substantially the design of straight circular cylinders. The two damper valve blocks 16, 17 may be integrally connected to the base block 13. The damper valve blocks 16, 17 serve to receive and/or represent the damper valve devices 8 and 9. The two damper valve blocks 16, 17 are arranged coaxially to each other and transversely to the longitudinal axis of the three-pipe damper 2.

The center valve block 12 further comprises a connection valve block 18. The connection valve block 18 is configured as a separate component and is attached to the base block 13.

For example, two screws 73, 74 serve to attach the connection valve block 18 to the base block 13 of the central valve block 12.

The design of the connection valve block 18 as a separate component has the advantage, among other things, that a package-dependent design of the vibration damper is possible with relatively little design effort, in particular when installed in different motor vehicle variants or motor vehicle derivatives. Moreover, the separate connection valve block 18 can be designed and arranged on the base block 13, such that specific crash requirements for a motor vehicle equipped with the vibration damper 1 can be ideally met.

With regard to the package-dependent design of the connection valve block 18, the positioning of hydraulic connections 23, 24 is particularly important. The hydraulic connections 23, 24 at the connection valve block 18 serve to connect hydraulic lines 27, 28, as can be seen in particular in FIGS. 4 and 5. The three-pipe damper 2 can be actively hydraulically controlled via the hydraulic lines 27, 28. To this end, hydraulic lines 27, 28 are hydraulically incorporated into an active damping control 29 that is indicated in FIG. 4 only by a rectangle.

Figure 4:
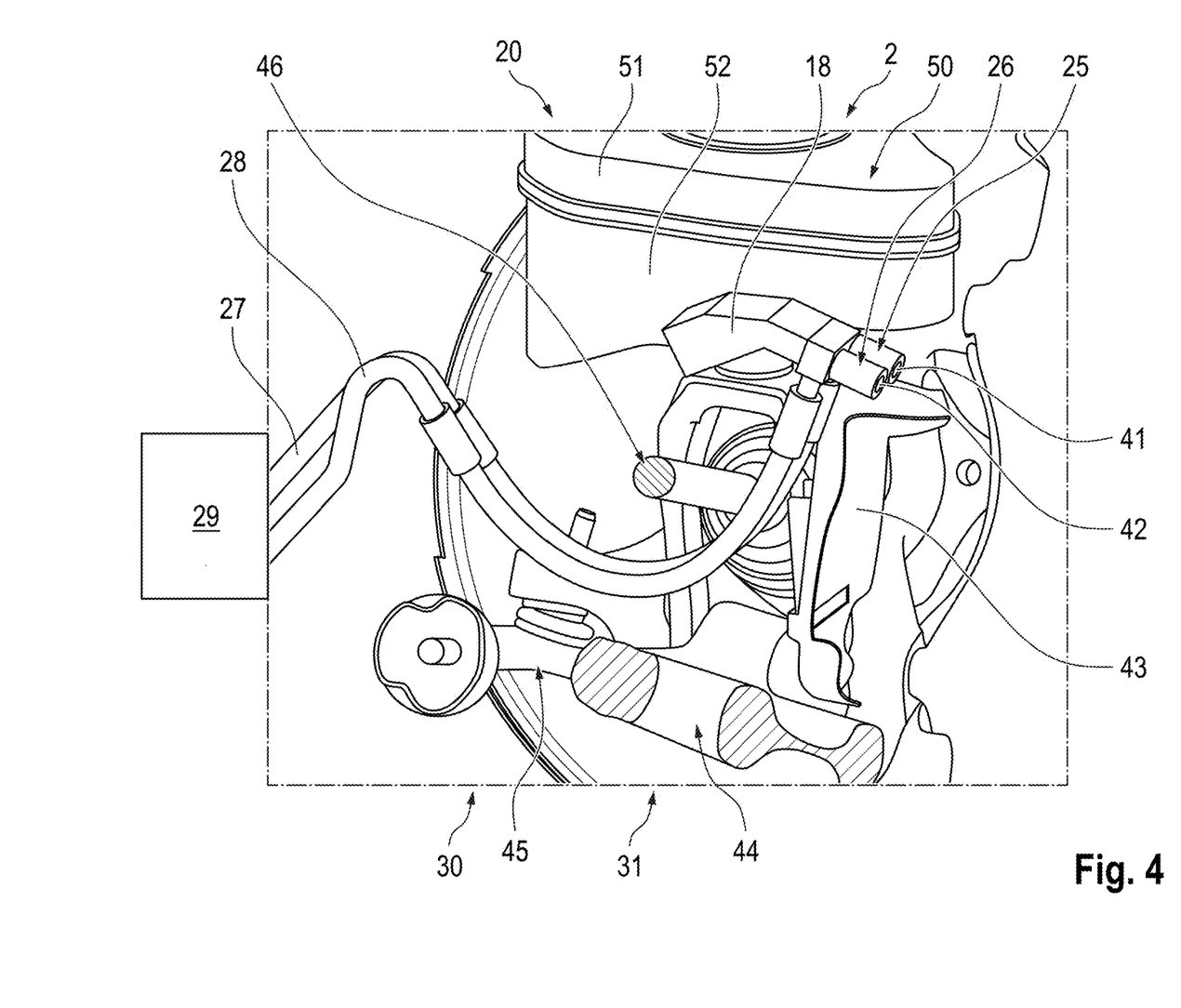
FIG. 4 shows a perspective view of a vibration damper having a three-pipe damper that is surrounded with an air spring at one end facing a front axle.
Figure 5:
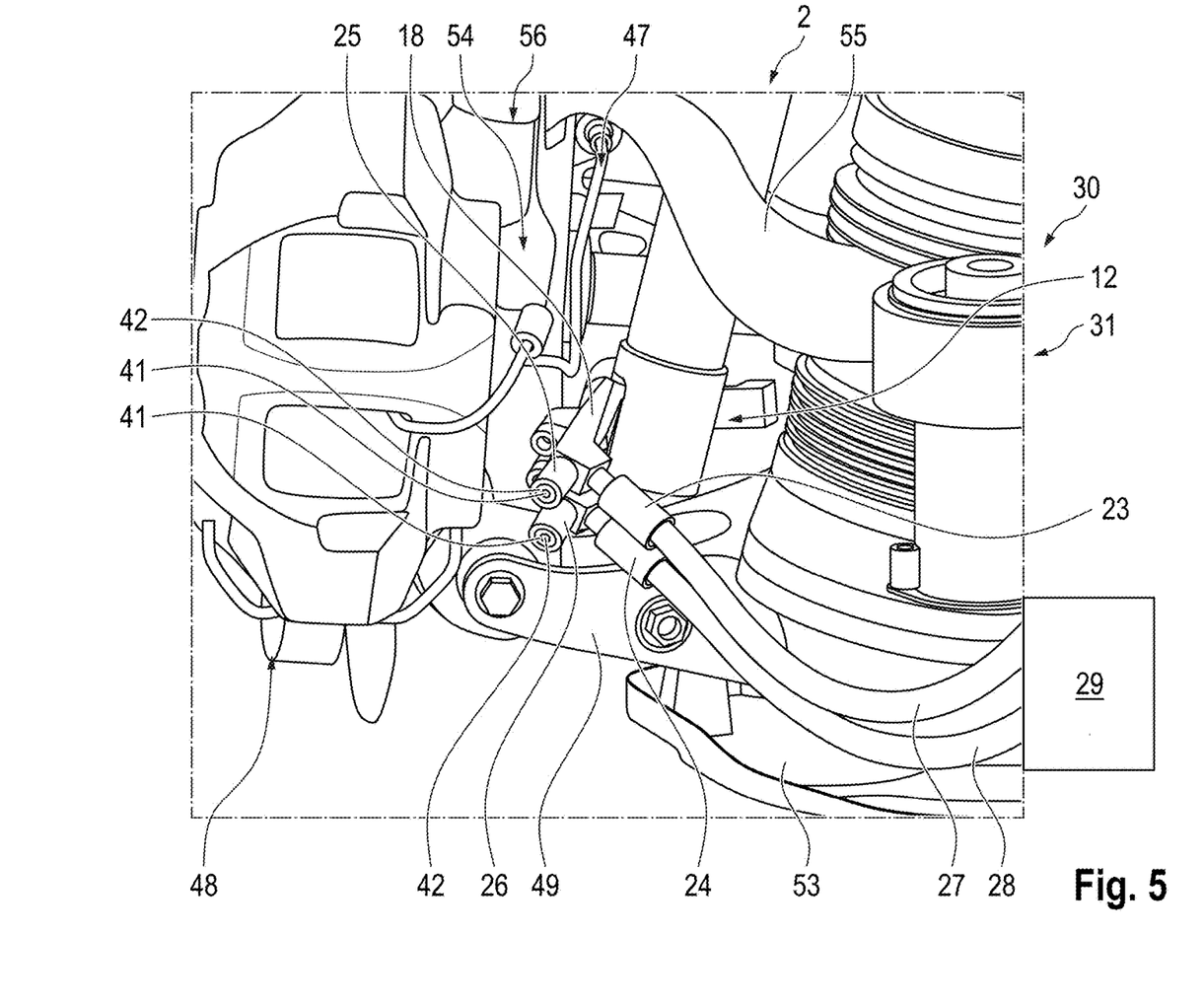
FIG. 5 shows a vibration damper having a three-pipe damper associated with a rear axle of a motor vehicle.

FIGS. 4 and 5 illustrate in a perspective view how the three-pipe damper 2 with the central valve block 12 at its lower end can be designed to suit the installation space, in particular when installed in a motor vehicle 30 with an active chassis 31.

The motor vehicle 30 indicated in FIGS. 4 and 5 only with the aid of various components 43 to 46 in FIGS. 4 and 47 to 49, 53 to 56 in FIG. 5 places high demands on a designer, in particular also because hoses and lines, in particular the hydraulic lines 27, 28, require sufficient clearance to the surrounding components over the entire spring and steering stroke during operation of the motor vehicle 30. Furthermore, bend radii and stretch lengths that occur must be observed.

An additional design effort results from the fact that the vibration damper 1 configured as a three-pipe damper 2 is combined with an air spring 20, as can be seen in FIG. 3, for example. The air spring 20 is advantageously configured and arranged, such that the air spring 20 surrounds the central valve block 12 from the lower end of the three-pipe damper 2. On the one hand, this maximizes the air spring space that can be represented by the air spring 20. Due to the large volume, the air spring 20 can be designed to be advantageously softer. In addition, the design and arrangement of the air spring 20 on and around the central valve block 12 results in package advantages.

The air spring 20 includes an air spring housing 50 having a housing upper part 51 and a housing bottom part 52. The air spring housing 50 includes a single, relatively large air volume. The air spring housing 50 extends around the lower end of the three-pipe damper 2 with the central valve block 12. In the axial direction, the air spring housing 50 is arranged between a bellows 58 and the central valve block 12, which is partially surrounded by the housing bottom 52.

The air spring housing 50, with its housing lower part 52, is supported by an axial support ring 15, which is attached to the lower end of the three-pipe damper 2. The axial support ring 15 is combined with an adapter body 14, which allows the air spring housing 50 to be attached on the outside to the container pipe 5 of the three-pipe damper 2. The air spring housing 50 is attached to the adapter body 14, for example by means of a snap connection or a latch connection.

FIG. 4 shows how the air spring housing 50 of the air spring 20 surrounds the central valve block 12, such that the connection valve block 18 remains free. In FIG. 4, the three-pipe damper 2 is associated with a front axle of the motor vehicle 30. Component 43 is a brake air supply. Component 44 is a lower transverse link. Component 45 is a tie rod. Component 46 is a cardan shaft.

FIG. 4 shows how the air spring volume of the air spring 20 extends around the connection valve block 18. Thus, a maximum air spring volume may be represented with the air spring housing 50. Moreover, FIG. 4 shows that the connection valve block 18 is designed such that, on the one hand, the connection of the hydraulic lines 27, 28 to the center valve block 12 is simplified. Moreover, shut-off screws 41, 42 of shut-off valves 25, 26 integrated in the connection valve block 18 are still accessible even when the air spring 20 is mounted.

In FIG. 5, the three-pipe damper 2 is associated with a rear axle of the motor vehicle 30. Component 47 is a further hydraulic line. Component 48 is a brake caliper. Component 49 is a lower transverse link. Component 53 is a transverse link cover. Component 54 is a holder with a brake line. Component 55 is an upper transverse link. Component 56 is a wheel carrier.

It can be seen in FIG. 5 that the connection valve block 18 is purposefully designed such that sufficient clearance to the wheel carrier 56 exists over the entire spring and steering stroke. Moreover, the connection valve block 18 and the hydraulic lines 27, 28, as well as the further hydraulic line 47, are designed such that sufficient clearance to the brake peripheries exists over the entire spring and steering stroke.

What is claimed is:

1. A motor vehicle having an active damping control, said motor vehicle comprising:
    a container pipe;
    a main pipe arranged in the container pipe;
    an intermediate pipe arranged between the main pipe and the container pipe, wherein the main pipe, the intermediate pipe and the container pipe are arranged coaxially and constitute a three-pipe damper;
    at least one vibration damper having (i) a damper piston, which is configured to be moved back and forth in the main pipe in an axial direction relative to the main pipe, and (ii) a piston rod having an end that is attached to the damper piston;
    a hydraulic end position damper;
    a central valve block disposed at an end of the three-pipe damper that faces away from the piston rod, wherein the central valve block has two damper valve devices and a connection valve block, which is configured as a separate component and comprises at least two hydraulic connections, wherein the connection valve block with the at least two hydraulic connections is arranged and aligned independently of two damper valve blocks on a base block in a package-dependent manner such that a connection of hydraulic lines is provided when the vibration damper is mounted with further components on the motor vehicle;
    a gas balance volume disposed in an annular space between the intermediate pipe and the container pipe; and
    an air spring housing surrounding the base block.

2. The motor vehicle of claim 1, further comprising shut-off screws of shut-off valves for the hydraulic connections that are integrated into the connection valve block.

3. The motor vehicle of claim 2, wherein the shut-off screws are aligned parallel to each other.

4. The motor vehicle according to claim 1, wherein the hydraulic connections are aligned parallel to each other.

5. The motor vehicle according to claim 1, wherein the damper valve blocks and the connection valve block are disposed on the base block extending in extension of the container pipe and from which the two damper valve blocks extend coaxially relative to each other in opposite directions radially outwards.

6. The motor vehicle according to claim 1, wherein the connection valve block is fastened onto the base block.

7. The motor vehicle according to claim 1, wherein the air spring housing extends up to the connection valve block.

8. The motor vehicle according to claim 1, wherein the air spring housing extends up to the damper valve blocks.

\* \* \* \* \*